United States Patent [19]

Ueda

[11] Patent Number: 5,784,931
[45] Date of Patent: *Jul. 28, 1998

[54] BICYCLE PEDAL

[75] Inventor: Yutaka Ueda, Tondabayashi, Japan

[73] Assignee: Shimano, Inc., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 676,930

[22] Filed: Jul. 8, 1996

[30] Foreign Application Priority Data

Jul. 12, 1995 [JP] Japan ................... 7-176304

[51] Int. Cl.$^6$ ................... G05G 1/14
[52] U.S. Cl. ................... 74/594.6; 74/534.4
[58] Field of Search ................... 74/594.4–594.6; 36/131, 132

[56] References Cited

U.S. PATENT DOCUMENTS

| | | | |
|---|---|---|---|
| 5,115,692 | 5/1992 | Nagano | 74/594.4 |
| 5,203,229 | 4/1993 | Chen | 74/594.6 |
| 5,259,270 | 11/1993 | Lin | 74/594.6 |
| 5,417,128 | 5/1995 | Beyl | 74/594.6 |
| 5,419,218 | 5/1995 | Romano | 74/594.6 |
| 5,423,233 | 6/1995 | Peyre et al. | 74/594.4 X |
| 5,557,985 | 9/1996 | Nagano | 74/594.6 |

FOREIGN PATENT DOCUMENTS

| | | |
|---|---|---|
| 0 146 454 A3 | 6/1985 | European Pat. Off. . |
| 2 609 270 | 7/1988 | European Pat. Off. . |
| 0 372 165 A2 | 6/1990 | European Pat. Off. . |
| 0 428 140 A1 | 5/1991 | European Pat. Off. . |
| 0 516 013 A2 | 12/1992 | European Pat. Off. ........... 74/594.6 |
| 0 568 109 A1 | 11/1993 | European Pat. Off. . |
| 0 569 048 A1 | 11/1993 | European Pat. Off. . |
| 0 572 291 A1 | 12/1993 | European Pat. Off. . |
| 0 576 042 A2 | 12/1993 | European Pat. Off. . |
| 0 619 219 A1 | 10/1994 | European Pat. Off. . |
| 43 23 575 A1 | 5/1994 | Germany . |
| 3-159893 | 7/1991 | Japan . |

OTHER PUBLICATIONS

European Search Report for EP 96 30 5140, dated Oct. 8, 1996.

Primary Examiner—Vinh T. Luong
Attorney, Agent, or Firm—James A. Deland

[57] ABSTRACT

A bicycle pedal includes front and rear cleat engaging members for engaging corresponding front and rear portions of a cleat affixed to a bicycle shoe. A tread cage having a relatively wide tread surface is coupled to the pedal for movement relative to at least one of the front cleat engaging member or rear cleat engaging member. The wide tread surface provides stable contact between the cycling shoe and the pedal when the cleat is disengaged from the cleat engaging members, and the movable tread cage allows the tread surface to move away from the cleat engaging members so as not to interfere when the cyclist is in the process of engaging the cleat with the cleat engaging members.

26 Claims, 6 Drawing Sheets

5,784,931

1

BICYCLE PEDAL

BACKGROUND OF THE INVENTION

The present invention is directed to bicycle pedals and, more particularly, to a bicycle pedal that can be linked to a cleat affixed to a bicycle shoe.

The invention disclosed in Japanese Laid-Open Patent Application 3-159893, called a clipless pedal, is known as a bicycle pedal that can be linked with a bicycle shoe. This clipless pedal has a pedal spindle that can be mounted on the crank of a bicycle, a pedal body that is rotatably supported on this pedal spindle, and a linking member comprising a pair of front and rear cleat engagement members that are fixed on either side of the pedal body and are capable of engaging front and rear portions of a cleat. The pedal body has a tread surface positioned so as to surround both sides of the linking member. This tread surface has only a small surface area because the pedal body has as small a volume as possible so that it will be lightweight. With this type of clipless pedal, the shoe and the pedal are in a state of constant engagement when the cleat is engaged in the cleat engagement members, so the pedaling force can be transmitted efficiently to the pedals. As a result, clipless pedals are widely employed on racing bicycles used in road racing and mountain bike racing.

Downhill races, dual slalom races, cross-country races, and other such off-road races for mountain bikes and BMX (bicycle motocross) have been widely staged in recent years. In this type of off-road race, unlike in road racing, the riders traverse an unpaved track. Furthermore, with this type of off-road racing the foot must be repeatedly taken off the pedal during cornering and replaced on the pedal after the corner has been exited. Unfortunately, since the racing is performed on unpaved roads, mud clings to the pedals and tends to clog the cleat engagement members. Once the cleat engagement members become clogged with mud, the cleat cannot be engaged in the cleat engagement members, and the shoe cannot be attached to the pedal.

When a cleat cannot be engaged with the cleat engagement members because of mud clogging, or when the feet are frequently removed from the pedals, the rider must often step on the pedal without the cleat being engaged in the cleat engagement members. However, since the pedal body of the above-mentioned conventional clipless pedals has as small a volume as possible and has only a small tread surface, the foot would slip around to the left and right when the cleat was not engaged with the cleat engagement members. As a result, the pedaling force is not transmitted efficiently to the pedals, and the speed of the bicycle drops. Lower speed is a critical problem for a racer. Accordingly, when it is expected that the pedals will become clogged with mud or the shoes will be taken off and replaced on the pedals frequently in this type of off-road race, more and more riders are using ordinary double-sided pedals rather than clipless pedals. Such pedals have no cleat engagement members, but they provide a good grip to the shoes. However, in either case, the cyclist does not have an optimum apparatus for pedaling the bicycle.

For a clipless pedal to be usable in such muddy situations, it must be possible for the rider to step on the pedal stably even when the cleat is not engaged with the cleat engagement members. One possible means for achieving this could be to provide a wider tread cage on the pedal around the outside of the cleat engagement members so that more tread surface can come into contact with the shoe sole. As shown in FIG. 7, however, a mountain bike shoe 21 differs from a

2 road shoe in that the cleat 22 is recessed into the shoe sole 27 to make walking more comfortable. Thus, if a wide tread cage is provided around the outside of the cleat engagement members, then the tread cage will interfere with the shoe sole 27 and get in the way when the cleat is being engaged with the cleat engagement members. This, in turn, limits the engagement direction of the shoe. Consequently, when the shoe is inserted from a direction other than the engagement direction, it will be difficult to re-engage the cleat with the cleat engagement members quickly even if there is no mud clogging or the like.

SUMMARY OF THE INVENTION

The present invention is directed to a bicycle pedal wherein the pedaling force can be transmitted efficiently even if the cleat is not engaged, but wherein the cleat also can be engaged with ease. In one embodiment of the present invention directed to a bicycle pedal for attachment to a cleat fixed to a bicycle shoe, front and rear cleat engaging members are coupled to the pedal for engaging corresponding front and rear portions of the cleat. A tread cage having a relatively wide tread surface is coupled to the pedal for movement relative to at least one of the front cleat engaging member or rear cleat engaging member. The wide tread surface provides stable contact between the cycling shoe and the pedal when the cleat is disengaged from the cleat engaging members, and the movable tread cage allows the tread surface to move away from the cleat engaging members so as not to interfere when the cyclist is in the process of engaging the cleat with the cleat engaging members.

In a more specific embodiment, the tread cage is coupled to the pedal for movement relative to both the front cleat engaging member and rear cleat engaging member, and the front cleat engaging member and rear cleat engaging member are coupled together for moving as a unit relative to the tread cage. A longitudinally extending stopper member may be fixed relative to at least one of the front or rear cleat engaging members, and the tread cage may include an abutment for contacting the stopper member and limiting movement of the stopper member relative to the tread cage. A biasing means may be provided for biasing the front cleat engaging member upwards relative to the tread surface of the tread cage so that the cleat may be easily guided into the front cleat engaging member.

In a somewhat modified embodiment, the tread cage may be fixed relative to the front cleat engaging member, and the rear cleat engaging member may be coupled to the pedal for movement relative to the tread cage. A stopper member may be fixed relative to the rear cleat engaging member, and the tread cage may include an abutment for contacting the stopper member and limiting movement of the stopper member relative to the tread cage. In this embodiment, a tongue may be fixed relative to the rear cleat engaging member so as to extend toward the front cleat engaging member, and the front cleat engaging member may be the tread surface. The cleat may be engaged with the front cleat engaging member and then pressed down onto the tongue for causing the rear cleat engaging member to latch to the rear portion of the cleat.

DETAILED DESCRIPTION OF THE EMBODIMENTS

Figure 1:
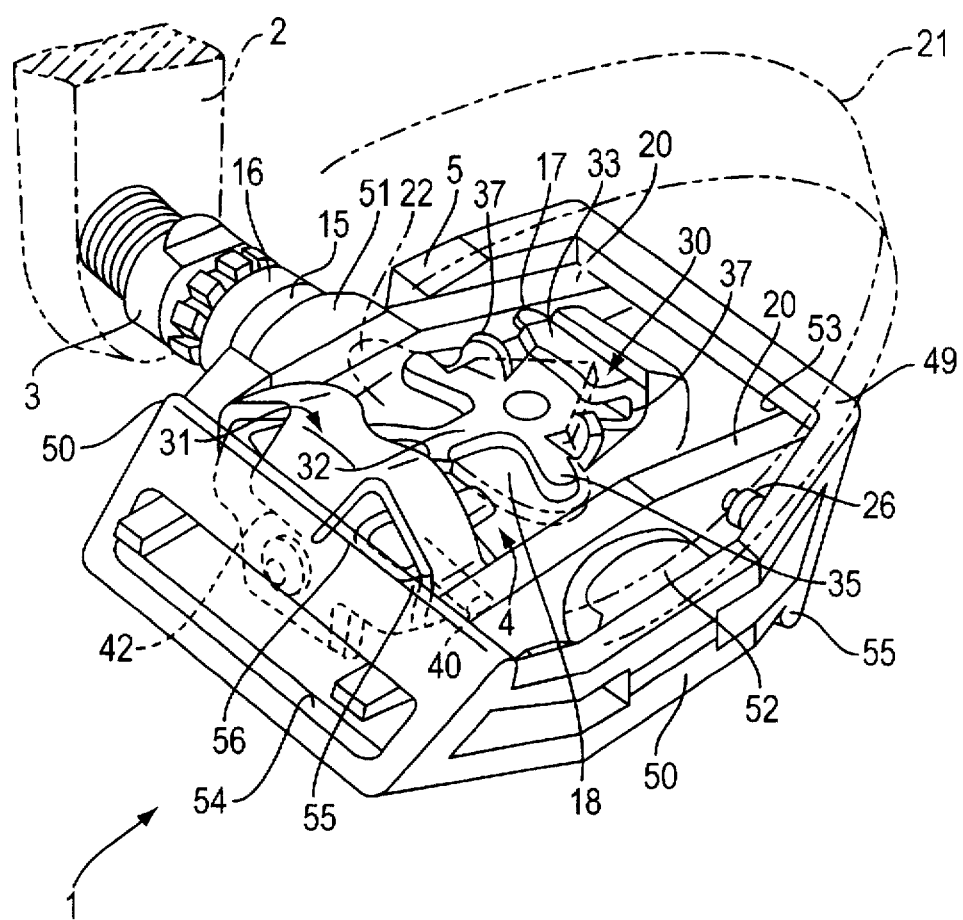
FIG. 1 is an oblique view of a particular embodiment of a bicycle pedal according to the present invention.

FIG. 1 is an oblique view of a particular embodiment of a bicycle pedal 1 according to the present invention. As shown in FIG. 1, pedal 1 comprises a pedal spindle 3 that is fastened to the crank 2 of a bicycle, a linking member 4 that is rotatably supported by the pedal spindle 3 for linking to a cleat 22 attached to a shoe 21, and a tread cage 5 that is positioned around the linking member 4 and is rotatably supported relative to the linking member 4.

Figure 3:
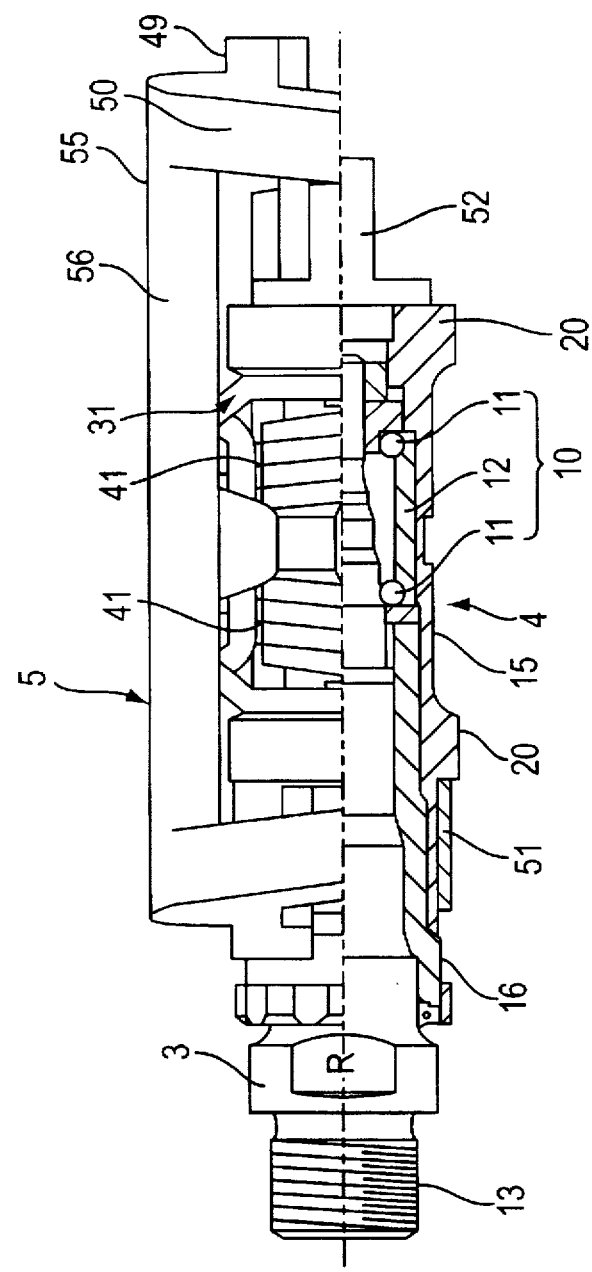
FIG. 3 is a partial cross-sectional view taken along line III—III of FIG. 2.

As shown in FIG. 3, the pedal spindle 3 is a multi-step spindle having numerous stepped portions, and the tip thereof rotatably supports the linking member 4 by means of a bearing 10. This bearing 10 has numerous steel balls 11 positioned in alignment in the peripheral direction at a distance in the axial direction from the outer periphery of the tip of the pedal spindle 3. An outer ring 12 houses the steel balls 11. A threaded component 13 that threads into the crank 2 (FIG. 1) is formed at the base end of the pedal spindle 3.

Figure 2:
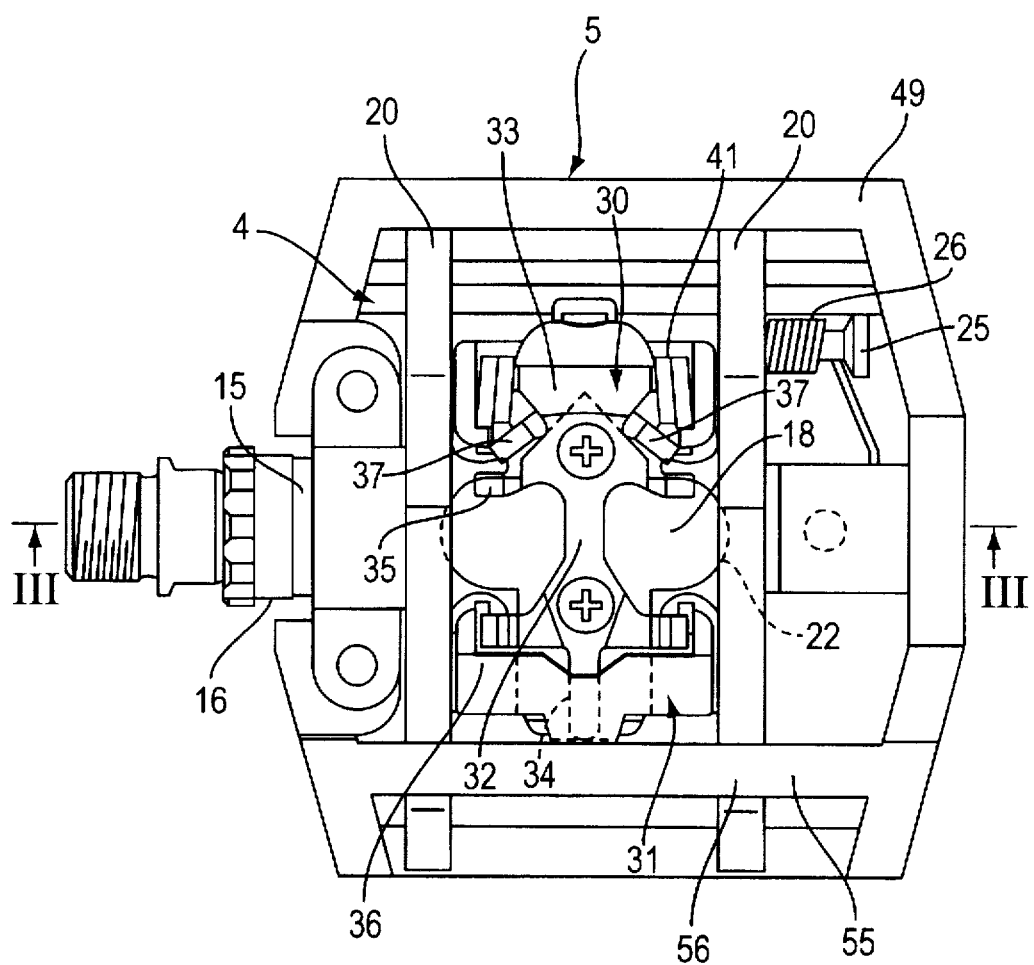
FIG. 2 is a plan view of the bicycle pedal shown in FIG. 1.
Figure 4:
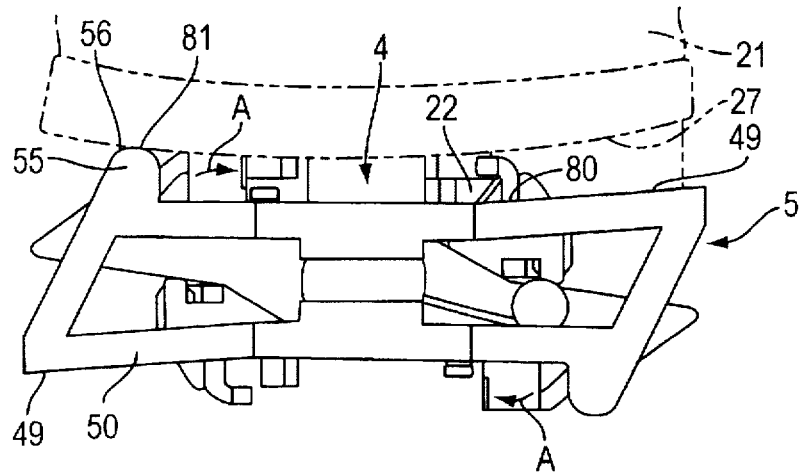
FIG. 4 is a side view of the bicycle pedal shown in FIG. 1.
Figure 5A:
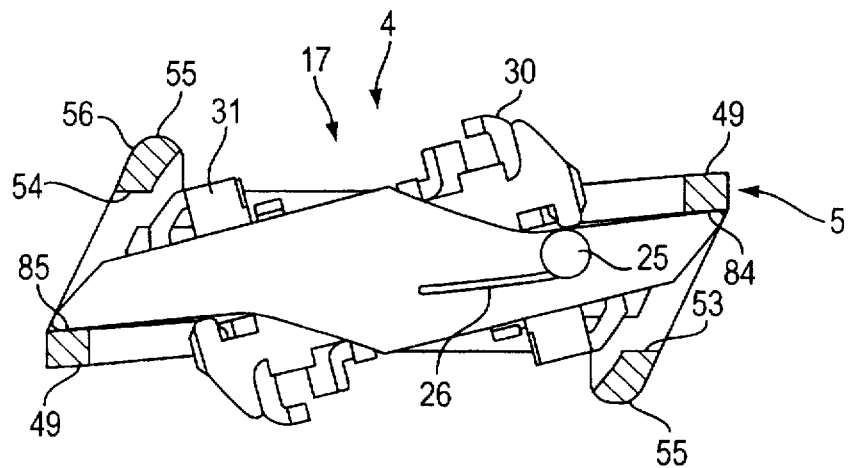
FIGS. 5A and 5B illustrate the operation of the bicycle pedal shown in FIG. 1.

As shown in FIGS. 1 through 4, the linking member 4 has a support in the form of an outer tube 15 that is rotatably supported by the pedal spindle 3 and on the inside of which is fitted the outer ring 12, an inner tube 16 that is fitted into the outer tube 15 such that its end is in contact with the outer ring 12, and a cleat engagement mechanism 17. The outer tube 15 and the inner tube 16 are concentrically arranged around the outside of the pedal spindle 3. The base end of the inner tube 16 projects out from the outer tube 15 on the crank 2 side at the same diameter as the outer tube 15. A pair of stopper members 20 that extend in the longitudinal direction (forward and backward) are provided around the outside of the outer tube 15 on opposite sides of the cleat engaging mechanism. Between the pair of stopper members 20, the outer tube 15 defines an engagement fixing surface 18 that serves to fix the cleat engagement mechanism 17. As shown in FIG. 2, a pin 25 extends from the front side surface of one of the stopper members 20, and a helical spring 26 is wound around the outside of the pin 25. One end of this spring is engaged with the stopper member 20, and the other end is engaged with the tread cage 5. This helical spring 26 biases the linking member 4 counterclockwise relative to the tread cage 5 as shown in FIG. 5A.

The cleat engagement mechanism 17 engages the pedal 1 with the cleat 22 attached to the sole of a bicycle shoe 21. The cleat engagement mechanism 17 has a front cleat engagement member 30 that engages the front of the cleat and a rear cleat engagement member 31 that engages the rear of the cleat. The front cleat engagement member 30 is symmetrical on the left and right. Cleat engagement member 30 has a fixed member 32 that is fixed to the engagement fixing surface 18, and a cleat clamping member 33 that curves out in a U shape above the front of the fixed member 32. A rotation stopper 34 that extends rearward is formed at the rear of the fixed member 32, and a pair of cleat supports 35 and 36 extend to the right and left in the center of the fixed member 32 with a space between them in the forward and backward direction. In the fixed member 32, a movement restricting stopper 37 that restricts the forward movement of the cleat is formed such that it curves upward between the cleat clamping member 33 and the cleat support 35.

The rear cleat engagement member 31 is curved in a roughly inverted U shape, and the two ends thereof are swingably supported by a fixed shaft 40 (see FIG. 1) that passes between the stopper members 20. A canceling spring 41 (the one shown in FIG. 2 is used for the rear cleat engagement member 31 on the back side) is wound around the outside of this fixed shaft 40, and this spring 41 biases the rear cleat engagement member 31 such that it always rotates forward (the direction of the arrow A in FIG. 4). In order to restrict this forward rotation, a tongue 42 that is in contact with the rotation stopper 34 extends downward in the center at the rear of the rear cleat engagement member 31.

The tread cage 5 is made of an aluminum alloy, for example, and has a frame 50 that is in the form of a compressed octagon (in plan view) and includes has a tread surface 49. A first bearing 51 is fixed to the crank 2 side of the frame 50 and is rotatably supported around the outside of the base end of the outer tube 15, and a second bearing 52 is fixed to the outer side of the frame 50 and is rotatably supported around the outer tip of the outer tube 15. Openings 53 and 54 are formed in the front and rear portions of the frame 50, and the tips of the stopper members 20 extend into these openings 53 and 54. The linking member 4 is biased in the counterclockwise direction by the helical spring 26 with respect to the tread cage 5 as shown in FIG. 5A, but counterclockwise rotation is restricted when the stopper members 20 inserted into the openings 53 and 54 hit abutments 84 and 85 formed by the upper and lower sides of openings 53 and 54, respectively. When the linking member 4 is in this position, the cleat clamping member 33 of the front cleat engagement member 30 is positioned above the tread surface 49 of the tread cage 5, and the rear cleat engagement member 31 is positioned below a brace member 55 (discussed below) disposed on the tread cage 5. As a result, when the shoe 21 is placed on the pedal 1, the cleat 22 can be engaged with the front cleat engagement member 30 without the shoe sole 27 interfering with the tread cage 5.

Figure 5B:
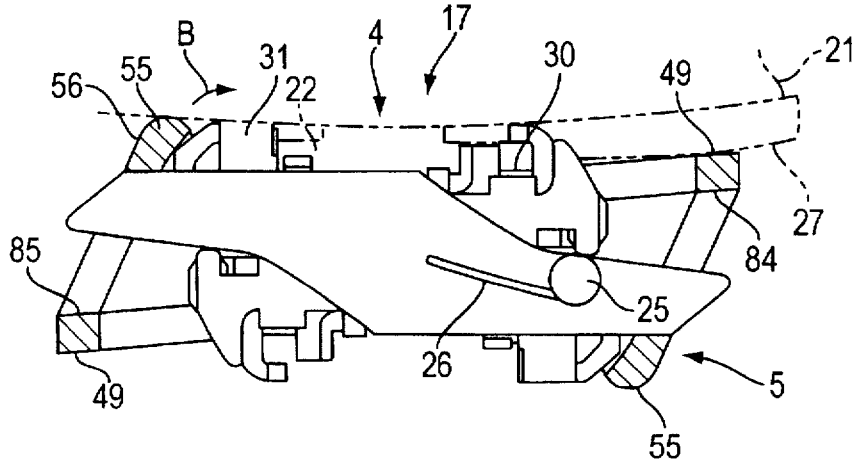

A brace member 55 that projects upward is formed on both sides at the rear end of the frame 50 of the tread cage 5. In this embodiment the brace member 55 has a semicircular cross section, and the rear end thereof is a guide member 56 that is used to guide the cleat 22 smoothly. As shown in FIG. 5B, the height of the brace member 55 is essentially the same as the height of the rear cleat engagement member 31 when the cleat 22 is engaged in the cleat engagement mechanism 17. Also, as shown in FIG. 2, the length of the brace member 55 in the pedal axial direction is greater than the length of the rear cleat engagement member 31. If a brace member 55 such as this is provided to the rear of the rear cleat engagement member 31, then the shoe sole 27 will be supported by brace member 55, and the looseness of the shoe to the right and left will be suppressed. As a result, the leg will not swing to the right and left, and the pedaling force will be transmitted to the pedals efficiently. In addition, since the guide member 56 of the brace member 55 serves as a guide for the shoe sole when the shoe 21 is attached, the cleat 22 attached to the shoe 21 can be smoothly guided to the cleat engagement mechanism 17.

Operation of the pedal will now be described with reference to FIGS. 5A and 5B. In a state in which the shoe is not attached to the pedal 1, as shown in FIG. 5A, the front cleat engagement member 30 of the linking member 4 is biased by the helical spring 26 and is positioned above the tread surface 49 of the tread cage 5, while the rear cleat engagement member 31 is positioned below the tread cage 5. When the shoe 21 is to be attached to the pedal 1, the tip of the shoe sole 27 is moved forward toward the front cleat engagement member 30 while in contact with the brace member 55, and the tip of cleat 22 is inserted into the cleat clamping member 33. In this state, since the front cleat engagement member 30 is positioned above a portion 80 of the tread surface 49 of the tread cage 5, in the axial pedal direction the tread cage 5 does not get in the way, and the tip of the cleat 22 can be easily inserted into the front cleat engagement member 30. As used herein, the phrase "axial pedal direction" refers to the direction of the pedal spindle 3 and viewed as shown in FIGS. 4 and 5A–5B.

Once the tip of the cleat 22 has been inserted into the cleat clamping member 33 of the front cleat engagement member 30, force is applied to the heel side of the shoe 21, and the shoe 21 is pushed down toward the pedal 1. As a result, the brace member 55 is pressed, the tread cage 5 and the linking member 4 rotate relative to each other against the biasing force of the helical spring 26, and the two end up nearly parallel, as shown in FIG. 5B. When the heel is pressed down further from this state, the rear end of the cleat 22 rotates the rear cleat engagement member 31 backward (the opposite direction from the arrow A in FIG. 4) against the biasing force of the spring 41, and the cleat 22 slides between the two cleat engagement members 30 and 31. Once the cleat 22 has slid between the two cleat engagement members 30 and 31, the rear cleat engagement member 31 is biased by the spring 41 into its original position wherein the tongue 42 hits against the rotation stopper 34. As a result, the cleat 22 is engaged between the two cleat engagement members 30 and 31.

When the cleat 22 is engaged in the two cleat engagement members 30 and 31, since the tread cage 5 is biased by the helical spring 26 forward (the direction of the arrow B in FIG. 5B) with respect to the linking member 4, the shoe sole 27 comes into contact with the brace member 55, wherein the rear cleat engaging member 31 is aligned with a portion 81 of the tread surface 49 of the tread cage 5 in the axial pedal direction. As a result, the shoe sole 27 is stabilized, the shoe 21 resists leaning to the left or right, and the pedaling force is transmitted efficiently to the pedal 1. Also, even if a tread cage 5 having a relatively wide tread surface 49 is positioned around the linking member 4, since the tread cage 5 and the linking member 4 rotate relative to each other, the front cleat engagement member 30 can always be positioned above the portion 80 of the tread cage 5, and the engagement of the cleat 22 is easy.

When the shoe 21 is placed on the pedal 1 in a state in which the cleat 22 is not engaged with the two cleat engagement members 30 and 31, then the linking member 4 rotates and the cleat engagement mechanism 17 retracts. As a result, the shoe sole 27 hits the wide tread surface 49, and the leg is able to move the pedal 1 in a stable attitude without wobbling to the left and right, so the function of a clipless pedal and the function of a double-sided pedal can both be realized with a single pedal. Accordingly, the pedaling force can be transmitted efficiently to the pedal 1 even in a state in which the cleat is not engaged during frequent cornering or in a state in which cleat engagement is impossible because of mud clogging during a race. Also, when the shoe is to be removed from the pedal 1, if the heel portion of the shoe 21 is lightly twisted to the outside, the rear cleat engagement member 31 will rotate to the rear against the energizing force of the spring 41, and the engagement of the rear end of the cleat 22 will be released instantly.

Figure 6:
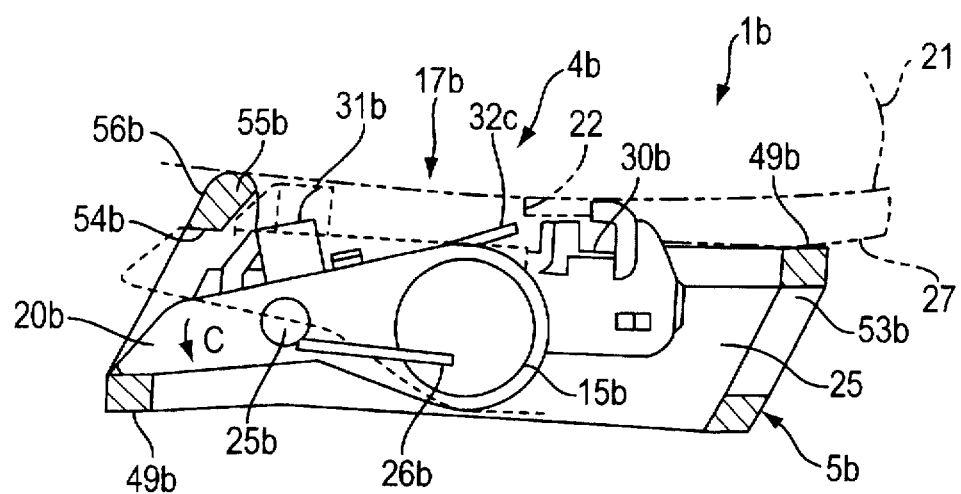
FIG. 6 is a side view of an alternative embodiment of a bicycle pedal according to the present invention.
Figure 7:
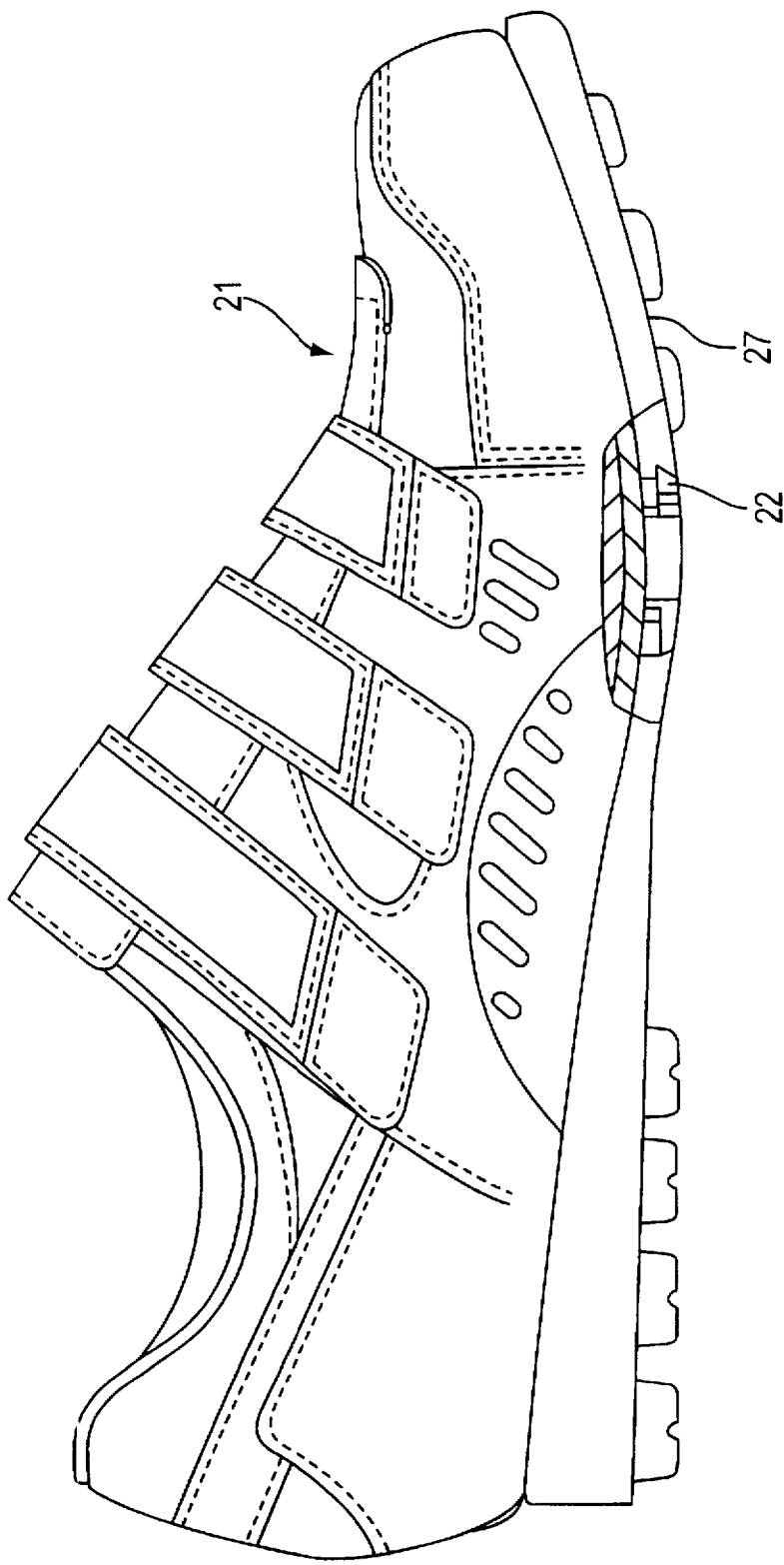
FIG. 7 is a partial cross-sectional view of a known bicycle shoe illustrating a recessed cleat.

FIG. 6 is a side view of an alternative embodiment of a bicycle pedal according to the present invention. As shown in FIG. 6, the pedal may be constructed such that only the rear cleat engagement member 31b of the linking member 4b is able to rotate with respect to the tread cage 5b. With this construction, one side is a clipless pedal and the other side is an ordinary pedal with which the cleat cannot be engaged. The outer tube 15b is fixed with the tread cage 5b, and the stopper members 20b are rotatably supported by the outer tube 15b. A pin 25b projects from the stopper member 20b, and a helical spring 26b is wound around this pin 25b. A rear cleat engagement member 31b is biased by this spring 26b in the direction of the arrow C.

A tongue 32c that rotates along with the stopper members 20b is provided to a fixed member 32b. When the cleat 22 holds tongue 32c down, the rear cleat engagement member 31b rises to the position indicated by the broken line. Thus, when the shoe 21 is attached to the pedal 1b, the rear cleat engagement member 31b is positioned in a straight line with the front cleat engagement member 30b, as indicated by the broken line, and the cleat 22 can be engaged. With this construction the cleat 22 can be engaged with ease and the pedaling force can be transmitted efficiently even if the pedal 1b is not engaged.

While the above is a description of various embodiments of the present invention, further modifications may be employed without departing from the spirit and scope of the present invention. For example, the shape of the cleat engagement members is not limited to that in the above embodiments, and the present invention can also be applied to cleats of other configurations. The configuration and position of the biasing means for biasing the tread cage and the linking can take many different forms. Similarly, the structure and position of the brace member are not limited to those in the above embodiment. The present invention can also be applied to a shoe in which the cleat projects out from the shoe sole, as in the case of a road-racing shoe. Since the sole of a shoe such as this is usually made from a relatively hard synthetic resin, the effect of the present invention at preventing looseness will be even better compared to a mountain bike shoe. A lever member may be positioned at both ends of the brace member 55a, and the lever member swingably supported by the brace frame 6.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle pedal comprising:
   a pedal spindle (3);
   a support (15) mounted to the pedal spindle (3), wherein the support (15) rotates around the pedal spindle (3);
   front and rear cleat engaging members (30,30b,31,31b) coupled to the pedal, wherein at least one of the front and rear cleat engaging members (30,30b,31,31b) is coupled to the support (15) so that the at least one of the front and rear cleat engaging members (30,30b,31,31b) pivots relative to the support (15) and rotates around the pedal spindle (3); and
   a tread cage (5) having a tread surface (49), the tread cage (5) being coupled to the pedal so that the tread cage (5)

rotates around the pedal spindle (3) and rotates relative to the support (15).

2. The pedal according to claim 1 wherein at least one of the front cleat engaging member (30,30b) or rear cleat engaging member (31,31b) is structured for movement to a position above the tread surface of the tread cage (5) viewed in an axial pedal direction.

3. The pedal according to claim 2 further comprising biasing means for biasing the front cleat engaging member (30) upwards relative to the tread surface (49) of the tread cage (5).

4. The pedal according to claim 3 wherein the front cleat engaging member (30) is aligned above a portion (80) of the tread surface (49) of the tread cage (5) in the axial pedal direction.

5. The pedal according to claim 3 wherein the rear cleat engaging member (31,31b) is aligned with a portion (81) of the tread surface (49) of the tread cage (5) in the axial pedal direction.

6. The pedal according to claim 1 further comprising a brace member (55,55b) positioned behind the rear cleat engaging member (31,31b), the brace member (55,55b) having a height that is greater than or equal to a height of the rear cleat engaging member (31,31b).

7. The pedal according to claim 6 wherein the brace member (55,55b) includes an upper guide surface (56,56b).

8. The pedal according to claim 6 wherein a length of the brace member (55,55b) in an axial pedal direction is greater than or equal to a length of the rear cleat engaging member (31,31b) in the axial pedal direction.

9. The pedal according to claim 1 wherein the tread cage (5) is fixed relative to the front cleat engaging member (30b), and wherein the rear cleat engaging member (31,31b) is coupled to the pedal for movement relative to the tread cage (5).

10. The pedal according to claim 1 wherein the tread cage (5) surrounds the front and rear cleat engaging members (30,30b,31,31b).

11. The pedal according to claim 1 further comprising a stopper member (20,20b) fixed relative to at least one of the front and rear cleat engaging members (30,30b,31,31b), the stopper member (20,20b) extending in a longitudinal direction.

12. The pedal according to claim 11 wherein the stopper member (20) is aligned below the front cleat engaging member (30) in the axial pedal direction.

13. The pedal according to claim 11 wherein the tread cage (5) is coupled to the pedal for movement relative to both the front cleat engaging member (30) and rear cleat engaging member (31), and wherein the front cleat engaging member (30) and rear cleat engaging member (31) are coupled together for moving as a unit relative to the tread cage (5).

14. The pedal according to claim 13 wherein the tread cage (5) includes an abutment (84,85) for contacting the stopper member (20) and limiting movement of the stopper member (20) relative to the tread cage (5).

15. The pedal according to claim 14 wherein the abutment (85) is positioned on a rear portion of the tread cage (5).

16. The pedal according to claim 15 wherein the stopper member (20) is aligned below the front cleat engaging member (30) in an axial pedal direction.

17. The pedal according to claim 11 wherein the tread cage (5) is fixed relative to the front cleat engaging member (30b), wherein the rear cleat engaging member (31b) is coupled to the pedal for movement relative to the tread cage (5), and wherein the stopper member (20b) is fixed relative to the rear cleat engaging member (31b).

18. The pedal according to claim 17 wherein the tread cage (5) includes an abutment for contacting the stopper member (20b) and limiting movement of the stopper member (20b) relative to the tread cage (5).

19. The pedal according to claim 18 wherein the abutment is positioned on a rear portion of the tread cage (5).

20. The pedal according to claim 19 further comprising a tongue (32c) fixed relative to the rear cleat engaging member (31b) and extending toward the front cleat engaging member (30b).

21. A bicycle pedal comprising:
front and rear cleat engaging members (30,30b,31,31b) coupled to the pedal;
a tread cage (5) having a tread surface (49), the tread cage (5) being coupled to the pedal for movement relative to at least one of the front cleat engaging member (30, 30b) or rear cleat engaging member (31,31b); and
a stopper member (20,20b) fixed relative to at least one of the front and rear cleat engaging members (30,30b,31, 31b), the stopper member (20,20b) extending in a longitudinal direction.

22. The pedal according to claim 21 wherein the stopper member (20) is aligned below the front cleat engaging member (30) in the axial pedal direction.

23. The pedal according to claim 21 wherein the tread cage (5) is coupled to the pedal for movement relative to both the front cleat engaging member (30) and rear cleat engaging member (31), and wherein the front cleat engaging member (30) and rear cleat engaging member (31) are coupled together for moving as a unit relative to the tread cage (5).

24. The pedal according to claim 23 wherein the tread cage (5) includes an abutment for contacting the stopper member (20) and limiting movement of the stopper member (20) relative to the tread cage (5).

25. The pedal according to claim 24 wherein the abutment is positioned on a rear portion of the tread cage (5).

26. The pedal according to claim 25 wherein the stopper member (20) is aligned below the front cleat engaging member (30) in an axial pedal direction.

* * * * *